United States Patent [19]
Tharp

[11] Patent Number: 5,587,114
[45] Date of Patent: Dec. 24, 1996

[54] AERATION SYSTEM EMPLOYING RETRIEVABLE AERATION MODULES

[75] Inventor: Charles E. Tharp, Columbia, Mo.

[73] Assignee: Environmental Dynamics, Inc., Columbia, Mo.

[21] Appl. No.: 471,768

[22] Filed: Jun. 6, 1995

[51] Int. Cl.$^6$ ........................................... B01F 3/04
[52] U.S. Cl. ................................. 261/124; 261/DIG. 47
[58] Field of Search ................... 261/DIG. 47, 122.1, 261/124

[56] References Cited

U.S. PATENT DOCUMENTS

| | | | |
|---|---|---|---|
| 2,650,810 | 9/1953 | Nordell | 261/DIG. 47 |
| 2,989,186 | 6/1961 | Weis | 261/DIG. 47 |
| 3,160,685 | 12/1964 | Chase | 261/DIG. 47 |
| 3,174,733 | 3/1965 | Chase | 261/DIG. 47 |
| 4,273,732 | 6/1981 | Roediger | 261/124 |
| 4,797,212 | 1/1989 | von Nordenskjold | 210/614 |
| 5,290,487 | 3/1994 | Ludwig | 261/122.1 |

FOREIGN PATENT DOCUMENTS

| | | | |
|---|---|---|---|
| 541291 | 3/1956 | Italy | 261/124 |

OTHER PUBLICATIONS

Chemineer–Kenics Model KSA Kenics Aerator Drawing, dated Nov. 1, 1980.

*Primary Examiner*—Tim R. Miles
*Attorney, Agent, or Firm*—Kokjer, Kircher, Bowman & Johnson

[57] ABSTRACT

An aeration/mixing system for applying air or another gas to wastewater or another liquid. A main air supply pipe receives air from a blower and directs the air to a plurality of aeration modules each including a submerged conduit and a plurality of diffusers on the conduit. Flexible hoses connect the main pipe with the conduit of each module. In one form of the invention, a flexible line connected with each module has a sliding connection with a ballast block and may be pulled tautly and secured at the surface to hold the module down in the basin. Retrieval of the module for maintenance requires only that the line be released so that the buoyancy of the module floats it upwardly. A modified embodiment includes an inflatable bladder on each module which can be inflated to cause the module to float upwardly for retrieval.

14 Claims, 3 Drawing Sheets

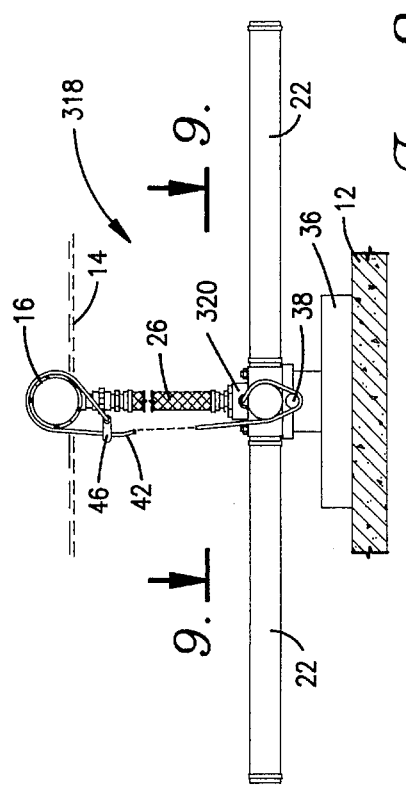
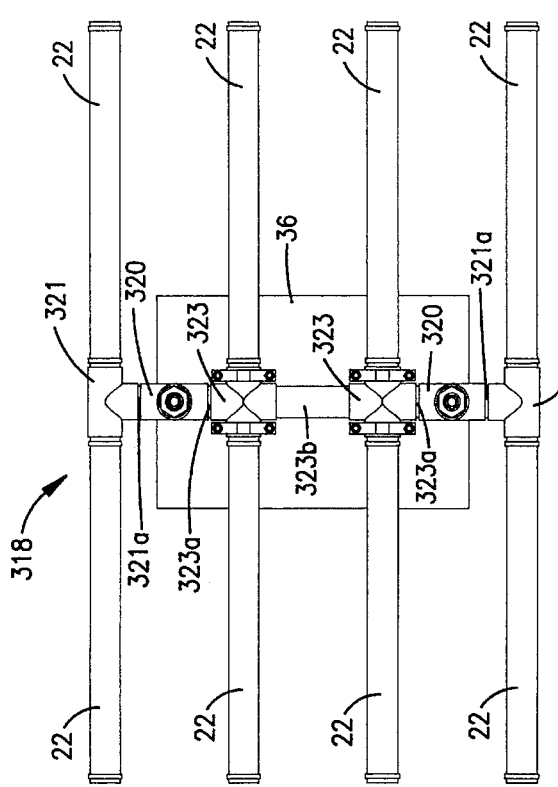
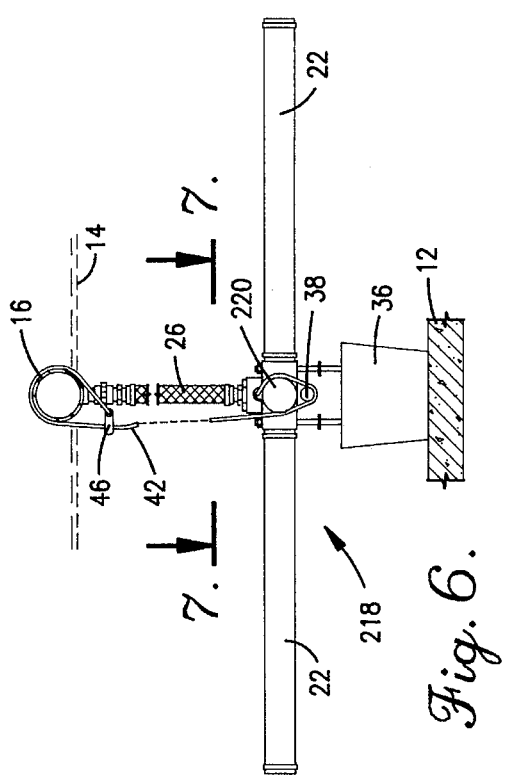
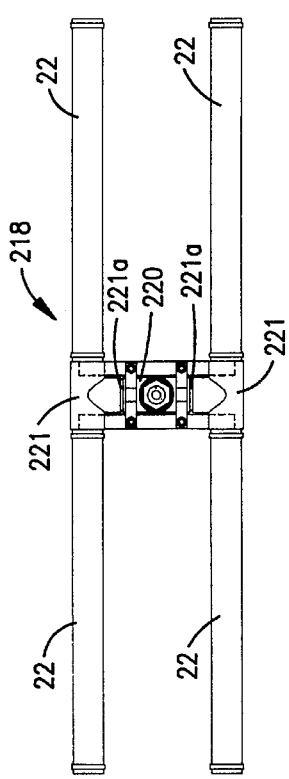

AERATION SYSTEM EMPLOYING RETRIEVABLE AERATION MODULES

FIELD OF THE INVENTION

This invention relates generally to the aeration of liquids and deals more particularly with an aeration/mixing system having a plurality of aeration modules which can be individually retrieved for maintenance or servicing of the air diffusers.

BACKGROUND OF THE INVENTION

There are a number of industrial applications which involve the application of air or another gas to a liquid. For example, in the treatment of wastewater, it is common practice to utilize aeration/mixing equipment to aerate and mix the wastewater in order to promote the biological processes that are involved in the treatment. Diffused aeration makes use of submerged diffusers which are supplied with air by a piping network and which discharge the air into the liquid. Both coarse bubble and fine bubble diffusers are used. The air discharging from the diffusers serves both to aerate the liquid in the treatment basin and to effect the necessary mixing of the liquid. The air supply piping network can be arranged in a variety of different ways. For example, the air supply pipes can be situated at a submerged location in one type of system. In another type of system, the main air supply pipes float on top of the liquid, and submerged diffuser assemblies are connected with the floating pipes by tubing or hoses. The diffuser assemblies can either be suspended from the floating pipe at a location above the floor of the basin or located on the basin floor. In either case, each diffuser assembly must be held down in the basin to counteract its buoyancy when filled with air.

Typically, ballast that is used to hold down the diffusers takes the form of a concrete or metal block which must be heavy enough to overcome the buoyancy of the diffuser assembly when it is filled with air. Recognizing that the diffuser assembly may include multiple diffusers each presenting a considerable volume which is filled with air, it can be appreciated that the ballast blocks must be rather large and heavy. This may make the diffuser assemblies difficult to handle and to install. Installation is particularly difficult in deep basins and in applications which involve high energy systems requiring the diffusers to be placed closely together. Diffuser assemblies that are suspended may also be difficult to stabilize and prevent from moving excessively due to the forces that result from the discharge of air from the diffusers.

SUMMARY OF THE INVENTION

The present invention is directed to an aeration/mixing system that is particularly useful in the treatment of water and wastewater. In accordance with the invention, the air supply piping includes a main supply pipe which is connected by flexible hoses to a plurality of aeration modules. Each of the aeration modules includes a conduit which is normally submerged and which supports and supplies a plurality of diffuser assemblies. A ballast block or other type of hold down system (such as a frame secured to the basin floor) normally holds each aeration module down near the floor of the treatment basin or lagoon in which the water or wastewater is contained, or to a prescribed submergence.

In one form of the invention, a flexible line or cable is tied at one end to the submerged conduit and is looped through the ballast (or hold down frame) and secured at the surface of the liquid, either to a float or to the main air supply pipe (in cases where it is a floating pipe). By pulling the line and securing it at the surface, the aeration module is pulled down and secured in operating position where the diffusers discharge air near the bottom of the basin or at the design submergence. For maintenance, the line can be released so that the aeration module floats to the surface due to its own buoyancy. The diffusers and other parts of the aeration module are then accessible so that they can be inspected and serviced or replaced if necessary. The module can be lowered again to its submerged operating position by pulling the line or cable and securing it at the design point.

In earthen basins and lined basins, the floor is commonly irregular, and the water depth can vary significantly from place to place. In such an application, the diffuser assemblies are typically suspended from the main air supply pipes which may be either floating or submerged. By suspending the diffusers above the basin floor, they can all be maintained at the same elevation to facilitate even air distribution. In concrete basins, the floor is generally level, so there is usually no need to suspend the diffusers in order to level them or control their elevation; they can be secured to the floor. The hold down system for a concrete basin can be fixed brackets embedded in or secured to the floor. The cables or lines can be looped through the brackets to hold the diffusers down while providing easy access to them when necessary.

In this manner, each aeration module can be quickly and easily installed and can be retrieved when necessary for maintenance work. The heavy ballast and/or fixed ballast frame remains in the basin and need not be raised with the aeration modules, thus facilitating handling of the diffuser assemblies. The conduits on which the diffusers are mounted are maintained in a level condition so that the individual diffusers are at the same elevation for balanced air flow. The conduits also provide stability to prevent excessive movement of the diffusers. Diffuser leveling and diffuser stability are accomplished regardless of the basin floor conditions. Basin depth variations are accommodated by proper submergence and proper adjustment of the cables or lines.

In a modified form of the invention, the retrieval system uses an inflatable bladder with or without the line. The bladder is connected with the aeration module and is normally deflated so that the ballast acts to hold the aeration module down in the operating position. To retrieve a module, the bladder is inflated through an inflation tube that is accessible from the surface of the liquid. When the bladder is inflated, the module is buoyant and floats to the surface where it is accessible for maintenance work. The module can be installed in its operating position again by bleeding the air from the bladder to reduce the buoyancy of the module enough that it moves back down to its operating position. In this embodiment, the ballast remains attached to the aeration module and is raised and lowered with the aeration module.

DESCRIPTION OF THE DRAWINGS

In the accompanying drawings which form a part of the specification and are to be read in conjunction therewith and in which like reference numerals are used to indicate like parts in the various views:

FIG. 6 is a fragmentary end elevational view showing an aeration module included in an aeration/mixing system constructed according to still another embodiment of the invention, with the module in its operating position;

FIG. 7 is a fragmentary sectional view taken generally along line 7—7 of FIG. 6 in the direction of the arrows;

FIG. 8 is a fragmentary end elevational view showing an aeration module included in an aeration/mixing system constructed according to yet another embodiment of the invention, with the module in its operating position; and FIG. 9 is a fragmentary sectional view taken generally along line 9—9 of FIG. 8 in the direction of the arrows.

DETAILED DESCRIPTION OF THE INVENTION

Figure 1:
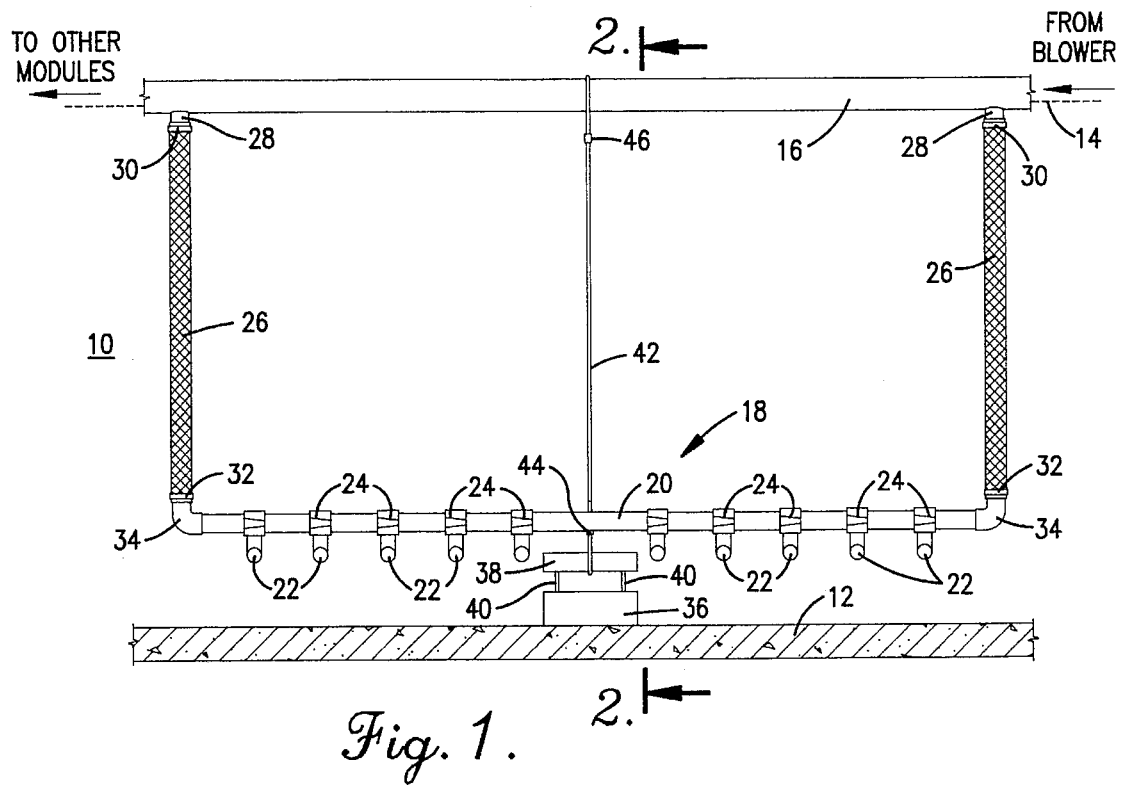
FIG. 1 is a fragmentary side elevational view showing one of the aeration modules included in an aeration/mixing system constructed according to one embodiment of the present invention, with the module secured in its operating position near the bottom at a specified submergence in a wastewater treatment basin.
Figure 2:
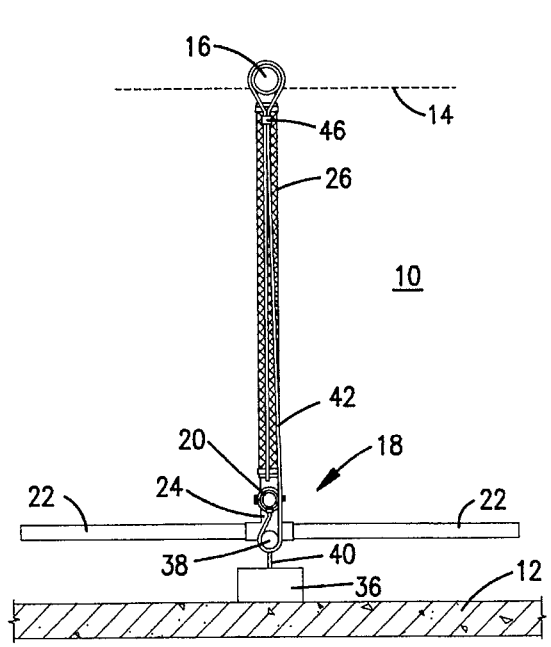
FIG. 2 is a fragmentary sectional view taken generally along line 2—2 of FIG. 1 in the direction of the arrows.
Figure 3:
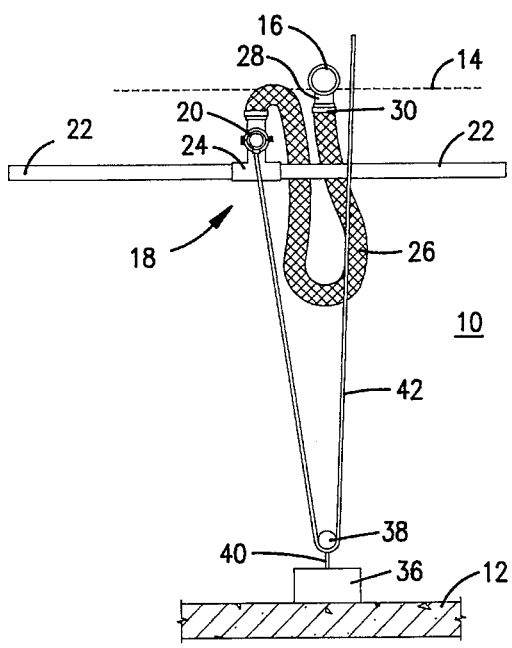
FIG. 3 is a fragmentary sectional view similar to FIG. 2, but showing the aeration module raised to a position accessible from the surface of the liquid for maintenance work.

Referring now to the drawings in more detail and initially to FIGS. 1–3, the present invention is directed to an aeration/mixing system which is used to apply air or another gas to liquid. By way of example, FIG. 1 illustrates a basin 10 having a concrete floor 12 and filled with wastewater to the level indicated by numeral 14. The wastewater contained in the basin 10 requires aeration and mixing to promote the biological processes which assist in purifying the wastewater during the treatment process. The aeration and mixing function is provided by the equipment of the present invention. It should be noted that the invention is also useful in other types of basins such as earthen and earthen lined (fabric) basins.

The aeration/mixing system includes one or more main air supply pipes or laterals 16 which are supplied with air under pressure from a blower, compressor or other source of compressed gas. If more than one air lateral 16 is included in the system, the laterals are normally arranged parallel to one another either across the width of the basin or along the length of the basin.

Each of the air laterals 16 supplies air to a plurality of aeration modules of the type generally identified by numeral 18 in FIG. 1. Each of the aeration modules 18 includes a submerged conduit or pipe 20 which may be constructed of stainless steel, PVC or other materials. The pipe 20 is normally submerged in the wastewater in the position shown in FIG. 1 and extends in a horizontal orientation when the system is in service.

Each aeration module 18 also includes a plurality of diffusers 22 which may be tubular fine bubble diffusers arranged in duplex assemblies. Each diffuser assembly includes a pair of diffusers 22 which extend transversely away from the pipe 20 in opposite directions and which may be mounted on the pipe 20 by means of a diffuser mounting saddle assembly 24 of the type disclosed in U.S. Pat. No. 4,960,546. The saddle assemblies 24 mount the diffusers 22 on the pipe 20 in a manner allowing the air to flow from the pipe 20 through the mounting assembly to the diffusers 22 which discharge it into the wastewater in the form of fine bubbles which rise to the surface 14 and thereby aerate and mix the wastewater. Reference may be made to U.S. Pat. No. 4,960,546 for a more detailed description of the mounting saddles 24 and the manner in which they mount the diffusers on the pipe 20.

The diffuser assemblies are spaced along the length of pipe 20 and may be rather close together. The diffusers 22 are preferably located near the floor 12 of the basin so that essentially the entire depth of the wastewater is aerated and mixed. In special applications, the diffusers may be located at other depths selected to suit the situation. For example, the diffusers may be located well above the floor in order to avoid disturbing settled sludge. Although FIG. 1 depicts ten diffuser assemblies (twenty diffusers) on the pipe 20, it is to be understood that a different number of diffuser assemblies can be mounted on each pipe of the aeration module 18. It should also be understood that diffusers that are different from the tubular diffusers 22 can be mounted to the pipe 20.

Air is supplied to each diffuser module 18 through one or more flexible hoses 26 which connect at their top ends with fittings 28 secured to the air lateral 16. The hoses 26 may be secured to the fittings 28 by hose clamps 30 or in any other suitable manner. The lower end of each hose 26 is secured by a hose clamp 32 (or other suitable means) to an elbow 34. The elbows 34 are suitably secured to the opposite ends of the aeration module pipe 20. The air in each lateral 16 is thus able to flow through the hoses 26 to pipe 20 and then to the diffusers 22.

Each aeration module 18 is equipped with one or more concrete blocks 36 which provide ballast for normally holding the module 18 down in the basin in its operating position (the position of FIG. 1). A cylindrical tube or pulley 38 is secured to each of the blocks 36 by a pair of rigid bars 40 which space the tube 38 above the body of the block 36. As an alternative to the ballast block, a metal frame or bracket secured to the floor 12 may be used to hold down the aeration modules.

A flexible line 42 which may take the form of a rope or cable has one end connected at 44 to the center of the pipe 20. As best shown in FIG. 2, the line 42 is looped beneath the line return tube 38 between the tube and the block 36 and then extends upwardly to the surface 14 where it is secured to the air lateral 16 at a location accessible from the surface of the wastewater. A releasable fastener 46 may be used to secure the line 42 around the air lateral 16.

Each aeration module 18 is held down in the proper operating position by the line 42. The line is pulled as required, with the looping of the line beneath the tube 32 resulting in pipe 20 being pulled downwardly as the line 42 is pulled upwardly. The line 42 is pulled until the hoses 26 are fully straightened out in the position shown in FIG. 1 or until the pipe 20 is level at the desired submergence. At this time, the aeration module 18 is in the proper operating position near the floor 12 of the treatment basin or at another desired depth. The line 42 is then secured to the air lateral 16 by looping it around the lateral and applying the fastener 46. The weight of the ballast block 36 and the tension in the line 42 thereafter holds the module 18 down in the basin during operation of the system. When the system operates, some of the air from the blower is applied to each of the aeration modules 18 through the hoses 26. Virtually any desired number of modules 18 can be arranged in series along each of the air laterals 16 in the system.

In the event that maintenance work is needed on any of the aeration modules 18, the module can be easily retrieved. To retrieve the module, the fastener 46 is released or removed and the line 42 is released. The buoyancy of the aeration module 18 then causes it to rise in the basin until it is at or near the surface 14 where the pipe 20, diffusers 22 and other components are accessible from the surface 14. The flexibility of the hoses 26 permit the module 18 to rise to a position wherein the module can be serviced.

After inspection and/or servicing of the aeration module 18 has been completed, it can be lowered again to its operating position by pulling on the free end of the line 42. This pulls the pipe 20 downwardly and straightens out the hoses 26 until the module is again in the operating position shown in FIG. 1. The line 42 can then be tied or otherwise secured to the air lateral 16 again.

Although the lateral 16 shown in FIG. 1 is a floating pipe which floats on the surface 14 of the wastewater, the pipe 16 can be a submerged pipe. If the pipe 16 is submerged, it is contemplated that each aeration module 18 will have a floating buoy or other float element (not shown) which floats on the surface above the module and provides a structure to which the line 42 can be secured. Thus, in a situation where the pipe 16 is submerged such that it is not readily accessible from the surface, the line 42 can be tied to a buoy, float or other member which is accessible from the surface 14 in order to permit retrieval and reinstallation of the module 18.

Although only one ballast block 36 is depicted in FIG. 1, additional blocks or variable size blocks can be provided for each module 18 if necessary or desirable. Each of the additional ballast blocks is associated with a line similar to line 42 in order to assist in holding down the aeration module 18 while permitting it to be retrieved for maintenance work.

The saddle assemblies 24 are removable from the pipe 20, thus allowing the diffuser assemblies to be repositioned on the pipe or replaced. In addition, additional diffuser assemblies can be added, and one or more of the diffuser assemblies can be eliminated. The pipe 20 can be any type material but is preferably constructed of a metal (such as stainless steel) so that it exhibits considerable weight and allows a reduction in the weight of the ballast 36. The pipe 20 can be maintained in a horizontal position so that the air flow to each of the diffusers 22 remains in a balanced condition. As previously indicated, additional ballast blocks 36 can be provided if necessary. By way of example, if the end or ends of the pipe 20 tend to move to an undue extent during operation of the system, additional ballast blocks 36 can be provided at or near one or both ends of the pipe 20 in order to hold the end or ends down or otherwise stabilize the aeration module and thus maintain the pipe 20 in a level and stable position.

The aeration/mixing system of the present invention provides considerable flexibility and other advantages. Each of the modules 18 can be equipped with virtually any desired number of diffusers which can be any type of diffuser arranged however desired. Each module can be easily installed, and the diffusers can be quickly and easily maintained by reason of the manner in which the entire module can be retrieved, serviced and then installed again at the proper location regardless of the condition of the basin floor. At the same time, diffusers can be added, repositioned, replaced or removed without undue difficulty and without disturbing the main air laterals 16 of the system. Leveling of the diffusers is also facilitated by reason of the construction of the modules 18.

Figure 4:
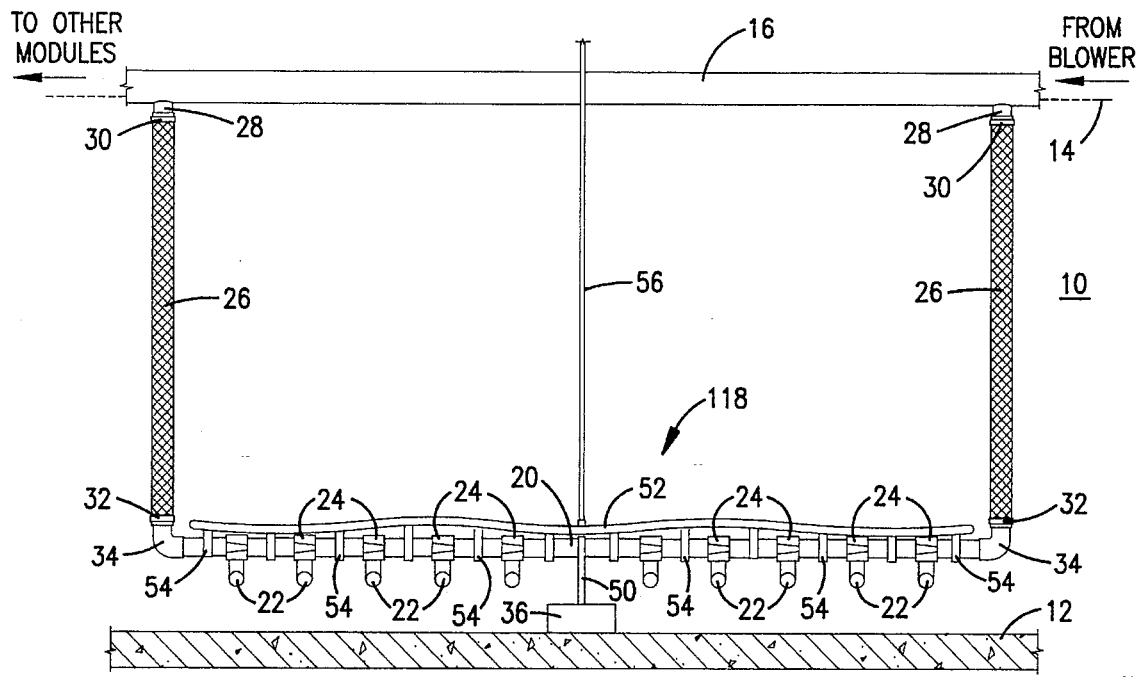
FIG. 4 is a fragmentary side elevational view showing one of the aeration modules included in an aeration/mixing system constructed according to another embodiment of the invention, with the aeration module in its operating position.
Figure 5:
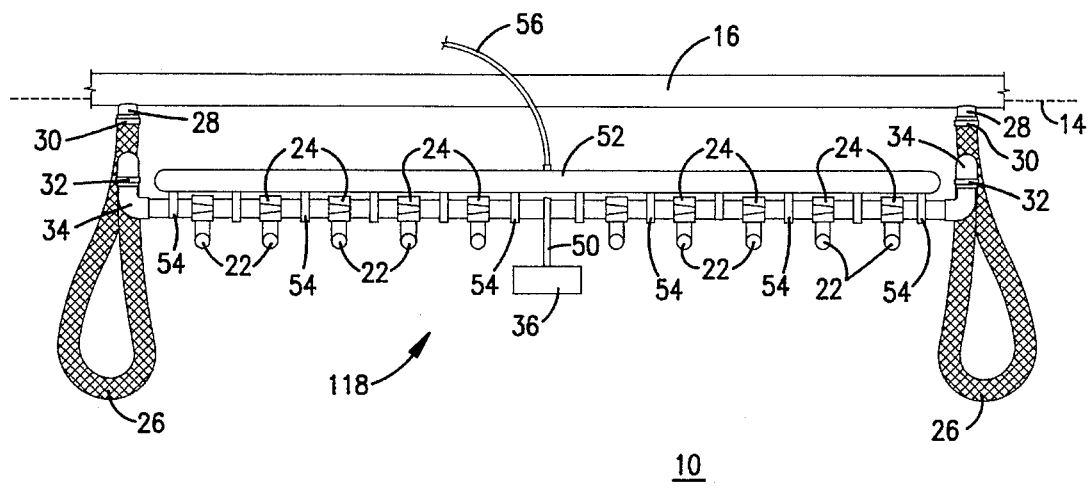
FIG. 5 is a fragmentary elevational view similar to FIG. 4, but showing the aeration module raised to a position accessible from the surface of the liquid for maintenance work.

FIGS. 4 and 5 depict a modified form of the invention which is characterized by a retrieval system that differs from the system shown in FIGS. 1–3. The same reference numerals are used in FIGS. 4 and 5 to depict components of the system which are similar to those included in the system of FIGS. 1–3.

In the arrangement of FIGS. 4 and 5, the ballast block 36 is secured to the pipe 20 by straps 50 or in any other suitable manner. The flexible line 42 may be eliminated; retrieval of the aeration modules 118 included in the system of FIGS. 4 and 5 is instead made possible by the provision of a bladder 52 which extends along the length of the pipe 20 and is connected with the pipe by straps 54 or other fastening means. An inflation tube 56 connects with the bladder 52 and is long enough to be accessible from the surface 14 when the module 118 is lowered to its submerged operating position, as shown in FIG. 4. It is noted that a line and cable may still be helpful to assist in stabilizing and/or removal of the aeration module for maintenance.

When the bladder 52 is in its normally deflated condition (see FIG. 4), the weight of the module 118 and the ballast block 36 is sufficient to hold the module down in the basin in its operating position. The aeration system normally operates with the module in this position, and air is discharged from the diffusers 22 in the manner described previously in connection with the embodiment shown in FIGS. 1–3.

In order to retrieve the module 118 for maintenance, air or another gas is applied to the inflation tube 56 in order to inflate the bladder 52 to its inflated condition which is shown in FIG. 5. When the bladder 52 is inflated, the buoyancy of the module 118 is great enough to overcome the weight of the module and the ballast block 36. Consequently, the module 118 floats upwardly to a position at or near the surface 14 where it is accessible and its components can be inspected and serviced as needed. When maintenance work on the module 118 has been completed, the air or other gas can be bled from the bladder 52 through tube 56, and the bladder 52 reverts to its deflated condition. Then, the buoyancy of the module 118 is reduced sufficiently that its weight and that of the ballast block 36 causes it to move downwardly in the basin until it eventually reaches the operating position shown in FIG. 4.

In this manner, the aeration modules 118 in the aeration/mixing system of FIGS. 4 and 5 can be retrieved as necessary for maintenance work and can be thereafter lowered to their operating positions near the floor 14 of the basin. The system of FIGS. 4–5 operates in substantially the same manner as described in connection with the system depicted in FIGS. 1–3, and the lateral 16 can be either a floating pipe or a submerged pipe as previously indicated.

FIGS. 6 and 7 depict a retrievable aeration module 218 which differs from the modules 18 and 118 described previously. The same reference numerals are used in FIGS. 6 and 7 to depict components which are similar to those included in the systems described previously.

The arrangement of FIGS. 6 and 7 functions similarly to that of FIGS. 1–3. However, a Tee fitting 220 is supplied with air from the flexible hose 26. At its opposite ends, the fitting 220 is connected with additional Tee fittings 221 by short pipe nipples 221a. A pair of the elongated tubular diffusers 22 connect with each of the Tee fittings 221. Each aeration module 218 thus includes four of the diffusers 22.

The ballast 36 and retrieval line 42 are arranged similarly to what has been previously described in connection with FIGS. 1–3.

The aeration module 218 aerates and mixes the wastewater in the same manner described previously. The desired number of modules 218 are arranged along the length of each lateral pipe 16 at the desired spacing. When aeration is taking place, the modules 218 are held down near the bottom or other submerged position by the lines 42. In order to retrieve one of the modules 218 for inspection or maintenance work, the fastener 46 is released so that the buoyancy of the module causes it to rise to the surface where it is accessible.

The ballast 36 remains on the basin floor 12 when the module is retrieved. As an alternative to the ballast 36, a bracket may be embedded in the floor 12 to hold the module 218 down by means of the line 42. It is also noted that the supply pipe 16 may be submerged rather than floating (with a float or other structure provided to maintain line 42 accessible from the surface if the pipe 16 is inaccessible).

Another type of aeration module 318 is shown in FIGS. 8–9. Here, the module is similar to the module 218 but includes eight diffusers 22 rather than four. Two hoses 26 extend to each module 318 from the lateral pipe 16. At their lower ends, the hoses 26 connect with Tee fittings 320. One end of each fitting 320 is connected with a Tee fitting 321 by a short pipe nipple 321a. The other ends of the fittings 320 are connected with crosses 323 by means of pipe nipples 323a. The two crosses 323 are connected by a pipe 323b. Two of the diffusers 22 are connected to each Tee 321 and to each cross 323.

The ballast 36 and line 42 are arranged in a manner similar to what has been previously described.

The operation and retrieval of the module 318 are substantially as previously described. Again, the ballast 36 can be replaced by a bracket embedded in the floor. The modules 218 and 318 can be retrieved by rising an inflatable bladder system similar to that depicted in FIGS. 4 and 5.

By way of example, a system of the type shown in FIGS. 1–3 may require ballast of approximately 2000–4000 pounds, depending upon the length of the module and the number and size of the diffusers. As can easily be appreciated, weights this great present significant materials handling problems when the ballast is to be installed or removed.

With large diffuser modules requiring 4000 pounds of ballast to hold the module down, the actual buoyant force of the module may be about 3000 pounds, as there would desirably be a significant safety factor involved in the ballast weight. Attempting to pull a diffuser module with this buoyancy underwater by hand from a small boat or work platform would be virtually impossible. Consequently, the module itself may be supplied with permanent ballast of slightly less than 3000 pounds so that its buoyancy would be only slightly above neutral. A ballast of about 1000 pounds on the floor would be used with a retrieval line to hold the module down. Pulling the module down to its operating position is then feasible, as all that must be overcome is the small difference between the module buoyancy and the permanent module ballast. This type of compound ballast arrangement greatly facilitates moving the modules to their operating positions with small boats or platforms and small winches or other equipment (or by hand).

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described the invention, what is claimed is:

1. Apparatus for aerating liquid in a basin, comprising:
   an air supply pipe in the basin adapted to receive air under pressure, said air supply pipe comprising a floating pipe on the surface of the liquid;
   a submerged conduit in the basin;
   a plurality of aerators mounted to said submerged conduit in a manner to receive air therefrom, said aerators being adapted to discharge air into the liquid;
   flexible hose means for directing air from said air supply pipe to said submerged conduit;
   means for normally holding said submerged conduit down in the basin at a submerged location; and
   means for disabling said holding means to allow the buoyancy of said conduit to raise the conduit and aerators to a location accessible from the surface of the liquid for maintenance.

2. Apparatus as set forth in claim 1, wherein said holding means comprises:
   ballast in the basin; and
   a flexible line connected with said submerged conduit, said line normally being secured at a location accessible from the surface and having a connection with said ballast effective to normally hold said submerged conduit down in the basin, said line being releasable from said normally secured condition to allow said submerged conduit and aerators to rise by buoyancy to a position accessible from the surface.

3. Apparatus as set forth in claim 1, wherein:
   said holding means comprises ballast in the basin connected with said submerged conduit;
   said disabling means comprises a bladder connected with said conduit and having an inflated condition wherein the buoyancy exhibited by the bladder is sufficient to raise the conduit to a location accessible from the surface; and
   said disabling means further comprises means for inflating said bladder.

4. Apparatus as set forth in claim 3, wherein said inflating means comprises an inflation tube connected with the bladder and accessible from the surface of the liquid to effect inflation of the bladder.

5. Apparatus for aerating liquid in a basin, comprising:
   an air supply pipe in the basin adapted to receive air under pressure;
   a plurality of aeration modules each including a submerged conduit submerged in the liquid in the basin and a plurality of diffusers mounted to the conduit for discharging air therefrom into the liquid;
   flexible hose means for directing air from said supply pipe to each submerged conduit;
   ballast in the basin for each conduit for normally holding the conduit down in the basin at a submerged location; and
   a flexible line connected with each conduit and having a sliding connection with the corresponding ballast to permit the line to be pulled to a taut condition and secured at a location accessible from the surface of the liquid to thereby hold down the aeration module, each line being releasable from a secured condition to allow the buoyancy of the corresponding aeration module to raise the module to a location accessible from the surface of the liquid.

6. Apparatus as set forth in claim 5, wherein said air supply pipe is submerged in the liquid in the basin.

7. Apparatus as set forth in claim 5, wherein the ballast rests on the bottom of the basin.

8. Apparatus as set forth in claim 5, including a float on the surface of the liquid to which said line may be tied.

9. Apparatus as set forth in claim 8, wherein said air supply pipe comprises a floating pipe which provides said float.

10. Apparatus for aerating liquid in a basin, comprising:

an air supply pipe in the basin adapted to receive air under pressure;

a plurality of aeration modules each including a submerged conduit submerged in the liquid in the basin and a plurality of diffusers mounted to the conduit for discharging air therefrom into the liquid;

flexible hose means for directing air from said supply pipe to each submerged conduit;

ballast in the basin for each conduit for normally holding the conduit down in the basin at a submerged location;

an inflatable bladder on each aeration module having a normally deflated condition wherein the aeration module is non-buoyant and an inflated condition wherein the aeration module is buoyant to effect raising of the aeration module to a location accessible from the surface of the liquid; and means for selectively effecting the deflated and inflated conditions of said bladder.

11. Apparatus as set forth in claim 10, wherein said means for selectively effecting the deflated and inflated conditions of said bladder comprises an inflation tube connected with the bladder and accessible from the surface of the liquid to apply gas to and bleed gas from the bladder.

12. Apparatus for aerating liquid in a basin having a bottom, comprising:

an air supply pipe in the basin adapted to receive air under pressure;

a submerged conduit in the basin;

a plurality of aerators mounted to said submerged conduit in a manner to receive air therefrom, said aerators being adapted to discharge air into the liquid;

flexible hose means for directing air from said air supply pipe to said submerged conduit;

a connector on the bottom of the basin; and a flexible line connected with said submerged conduit, said line normally being secured at a location accessible from the surface and having a connection with said connector effective to normally hold said submerged conduit down in the basin, said line being releasable from said normally secured condition to allow said submerged conduit and aerators to rise by buoyancy to a position accessible from the surface.

13. Apparatus for aerating liquid in a basin, comprising:

an air supply pipe in the basin adapted to receive air under pressure;

a submerged conduit in the basin;

a plurality of aerators mounted to said submerged conduit in a manner to receive air therefrom, said aerators being adapted to discharge air into the liquid;

flexible hose means for directing air from said air supply pipe to said submerged conduit;

ballast in the basin connected with said submerged conduit for normally holding the submerged conduit down in the basin;

a bladder connected with said submerged conduit and having an inflated conduit wherein the buoyancy exhibited by the bladder is sufficient to raise the conduit to a location accessible from the surface; and means for inflating said bladder.

14. Apparatus for aerating liquid in a basin, comprising:

an air supply pipe located in the liquid and adapted to receive air under pressure;

a submerged conduit in the basin;

a plurality of aerators mounted to said submerged conduit in a manner to receive air therefrom, said aerators being adapted to discharge air into the liquid;

a flexible hose extending substantially the entire distance between said air supply pipe to said submerged conduit to deliver air therebetween;

means for normally holding said submerged conduit down in the basin at a submerged location; and means for disabling said holding means to allow the buoyancy of said conduit to raise the conduit and aerators to a location accessible from the surface of the liquid for maintenance.

* * * * *